(12) United States Patent
Koshiyama (10) Patent No.: US 9,199,509 B2
(45) Date of Patent: Dec. 1, 2015

(54) BICYCLE HUB

(71) Applicant: Shimano Inc., Sakai, Osaka (JP)

(72) Inventor: Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 25 days.

(21) Appl. No.: 14/159,735

(22) Filed: Jan. 21, 2014

(65) Prior Publication Data

US 2015/0202919 A1 Jul. 23, 2015

(51) Int. Cl.
*F16D 41/32* (2006.01)
*F16D 41/36* (2006.01)
*B60B 27/02* (2006.01)

(52) U.S. Cl.
CPC .............. *B60B 27/023* (2013.01); *F16D 41/32* (2013.01); *B60B 2900/133* (2013.01); *B60Y 2200/13* (2013.01); *F16D 41/36* (2013.01)

(58) Field of Classification Search
CPC ....................................................... F16D 41/36
See application file for complete search history.

(56) References Cited

U.S. PATENT DOCUMENTS 2,800,986 A * 7/1957 Der Plas ..................... 192/217.6
4,593,799 A * 6/1986 Ozaki ............................. 192/46
5,964,332 A   10/1999 King

FOREIGN PATENT DOCUMENTS

FR            1038012    *  9/1953
GB             584472    *  1/1947

* cited by examiner

*Primary Examiner* — Ramya Burgess
*Assistant Examiner* — Mark Manley
(74) *Attorney, Agent, or Firm* — Global IP Counselors (57) ABSTRACT

A bicycle hub basically has a hub axle, a hub shell, a sprocket support body, a first ratchet member and a second ratchet member. The hub shell is rotatably mounted on a hub axle about a rotational axis. The sprocket support body is rotatably mounted on the hub axle to rotate around the rotational axis. The sprocket support body has an outer peripheral surface with a first helical spline. The first ratchet member has at least one first ratchet tooth and a second helical spline mating with the first helical spline. The second ratchet member has at least one second ratchet tooth mating with the at least one first ratchet tooth and a hub shell engagement portion that engages the hub shell The outer peripheral surface of the sprocket support body has a guiding portion that guides the first ratchet member toward the hub shell while coasting.

20 Claims, 6 Drawing Sheets

BICYCLE HUB

BACKGROUND

1. Field of the Invention

This invention generally relates to a bicycle hub. More specifically, the present invention relates to a bicycle hub which quieter during coasting as compared to a conventional bicycle hub.

2. Background Information

Generally, a bicycle wheels have a hub, a plurality of spokes and an annular rim. The hub has a hub axle that is non-rotatably mounted to a frame of the bicycle. The hub has a hub shell that is coaxially coupled to the hub axle so that the hub shell is disposed radially outwardly with respect to the hub axle. The bearings are configured and arranged to support the hub shell so that the hub shell can freely rotate around the hub axle.

In some bicycles having multiple speeds, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary. One example of a bicycle hub having a freewheel is disclosed in U.S. Pat. No. 5,964,332. In this patent, a bicycle freewheel is proposed that has a pair of engaging face gears with toothed surface to accomplish the torque transfer or freewheeling.

SUMMARY

Generally, the present disclosure is directed to various features of a bicycle hub. In one feature, a bicycle hub is provided in which ratchet noise and a ratchet teeth abrasion can be reduced during coasting with respect to a conventional bicycle hub having a conventional bicycle freewheel.

In view of the state of the known technology and in accordance with a first aspect of the present disclosure, a bicycle hub is provided that basically comprises a hub axle, a hub shell, a sprocket support body, a first ratchet member and a second ratchet member. The hub axle defines a rotational axis. The hub shell is rotatably mounted on the hub axle to rotate around the rotational axis. The sprocket support body is rotatably mounted on the hub axle to rotate around the rotational axis. The sprocket support body has an outer peripheral surface with a first helical spline. The first ratchet member has at least one first ratchet tooth and a second helical spline mating with the first helical spline. The second ratchet member has at least one second ratchet tooth mating with the at least one first ratchet tooth and a hub shell engagement portion that engages the hub shell The outer peripheral surface of the sprocket support body has a guiding portion configured to guide the first ratchet member toward the hub shell while coasting.

In accordance with a second aspect of the present invention, the bicycle hub according to the first aspect is configured so that the at least one first ratchet tooth is disposed on an axial facing surface of the first ratchet member, and so that the at least one second ratchet tooth is disposed on an axial facing surface of the second ratchet member that faces the axial facing surface of the first ratchet member.

In accordance with a third aspect of the present invention, the bicycle hub according to the first aspect is configured so that the first ratchet member is movably mounted in an axial direction with respect to the sprocket support body via the second helical spline engaging the first helical spline while driving by a first thrust force applied from the sprocket support body.

In accordance with a fourth aspect of the present invention, the bicycle hub according to the first aspect is configured so that the at least one second ratchet tooth mates with the at least one first ratchet tooth to transfer torque from the sprocket support body to the hub shell.

In accordance with a fifth aspect of the present invention, the bicycle hub according to the first aspect is configured so that the guiding portion is configured so as to release a meshing engagement between the at least one first ratchet tooth and the at least one second ratchet tooth while coasting.

In accordance with a sixth aspect of the present invention, the bicycle hub according to the first aspect is configured so that the guiding portion extends in at least a circumferential direction with respect to the sprocket support body.

In accordance with a seventh aspect of the present invention, the bicycle hub according to the first aspect is configured so that the second ratchet member transfers torque to the hub shell applied from the first ratchet member via the hub shell engagement portion.

In accordance with an eighth aspect of the present invention, the bicycle hub according to the first aspect is configured so that one of the hub shell engagement portion and the hub shell includes at least one protrusion extending radially and the other of the hub shell engagement portion and the hub shell includes at least one recess that is engaged with the at least one protrusion.

In accordance with a ninth aspect of the present invention, the bicycle hub according to the first aspect further comprises a biasing member disposed between the hub shell and the first ratchet member. The biasing member biases the first ratchet member in an axial direction toward the second ratchet member.

In accordance with a tenth aspect of the present invention, the bicycle hub according to the ninth aspect is configured so that the biasing member is configured to rotate with the hub shell, and so that the first ratchet member contacts the guiding portion and disengages from the second ratchet member by a second thrust force caused by friction torque between the biasing member and the first ratchet member while coasting.

In accordance with an eleventh aspect of the present invention, the bicycle hub according to the first aspect further comprises a cover member covering an annular gap between the sprocket support body and the hub shell.

In accordance with a twelfth aspect of the present invention, the bicycle hub according to the first aspect further comprises at least one bearing assembly rotatably supporting the sprocket support body on the hub axle.

In accordance with a thirteenth aspect of the present invention, the bicycle hub according to the first aspect further comprises at least one bearing assembly rotatably supporting the hub shell on the hub axle.

In accordance with a fourteenth aspect of the present invention, the bicycle hub according to the first aspect is configured so that the at least one first ratchet tooth includes a plurality of first ratchet teeth, and the at least one second ratchet tooth includes a plurality of second ratchet teeth.

In accordance with a fifteenth aspect of the present invention, the bicycle hub according to the first aspect is configured so that the sprocket support body includes a plurality of additional helical splines on the outer peripheral surface, and so that the first ratchet member includes a plurality of additional helical splines in mating engagement with the additional helical splines of the sprocket support body.

In accordance with a sixteenth aspect of the present invention, the bicycle hub according to the first aspect is configured so that the first and second ratchet members are annular members.

In accordance with a seventeenth aspect of the present invention, the bicycle hub according to the sixteenth aspect is configured so that the sprocket support body includes an abutment that abuts the second ratchet member to restrict axial movement of the second ratchet member away from the hub shell, and so that the first ratchet member is disposed on an axial side of the second ratchet member that is opposite to the abutment of the sprocket support body.

In accordance with an eighteenth aspect of the present invention, the bicycle hub according to the seventeenth aspect further comprises a biasing member disposed between the hub shell and the first ratchet member. The biasing member biases the first ratchet member in an axial direction toward the second ratchet member.

In accordance with a nineteenth aspect of the present invention, the bicycle hub according to the eighteenth aspect is configured so that the hub shell includes an internal space. The outer peripheral surface of the sprocket support body supports the first and second ratchet members. Each of the ratchet support body, the biasing member and the first and second ratchet members being at least partially disposed in the internal space of the hub shell.

In accordance with a twentieth aspect of the present invention, the bicycle hub according to the nineteenth aspect further comprises a cover member covering the internal space between the sprocket support body and the hub shell.

Also other objects, features, aspects and advantages of the disclosed bicycle hub will become apparent to those skilled in the art from the following detailed description, which, taken in conjunction with the annexed drawings, discloses one embodiment of the bicycle hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
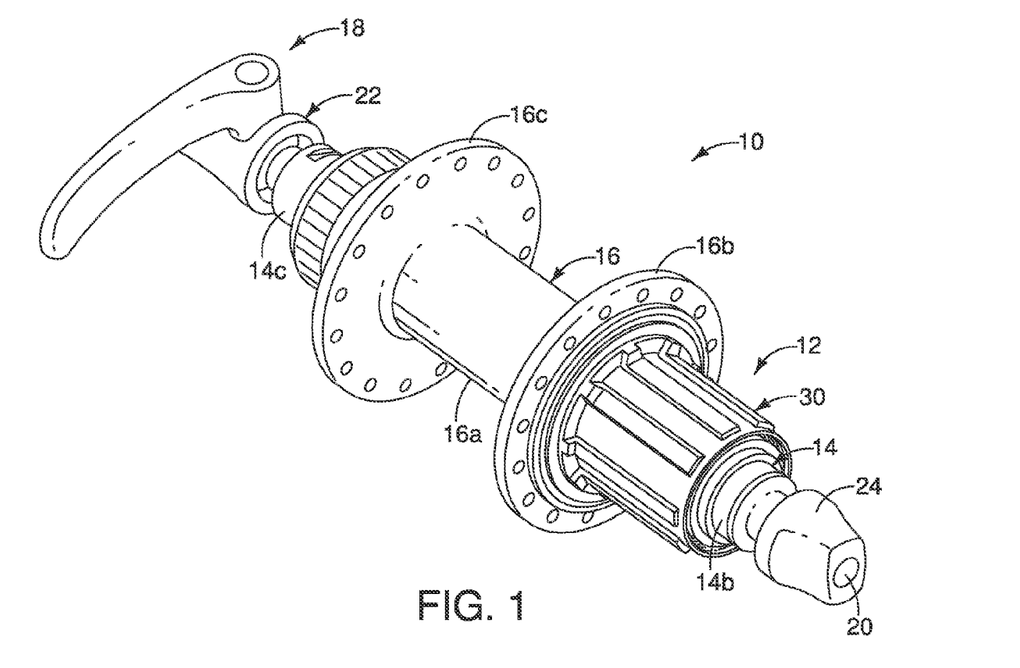
FIG. 1 is a perspective view of a rear bicycle hub in accordance with one illustrative embodiment.

Referring initially to FIG. 1, a rear bicycle hub 10 is illustrated that is equipped with a bicycle freewheel 12 in accordance with a first embodiment. As shown in FIG. 1, the bicycle hub 10 basically comprises a hub axle 14 and a hub shell 16. Here, the hub axle 14 is a conventional member having a shaft portion 14a with a first end cap 14b screwed on a first threaded end of the hub axle 14 and a second end cap 14c screwed on a second threaded end of the hub axle 14. The hub axle 14 defines a rotational axis A. The hub shell 16 is rotatably mounted on the hub axle 14 to rotate around the rotational axis A. The hub shell 16 has a center tubular body 16a and a pair of spoke attachment flanges 16b and 16c extending outwardly in a radial direction from the center tubular body 16a.

Figure 2:
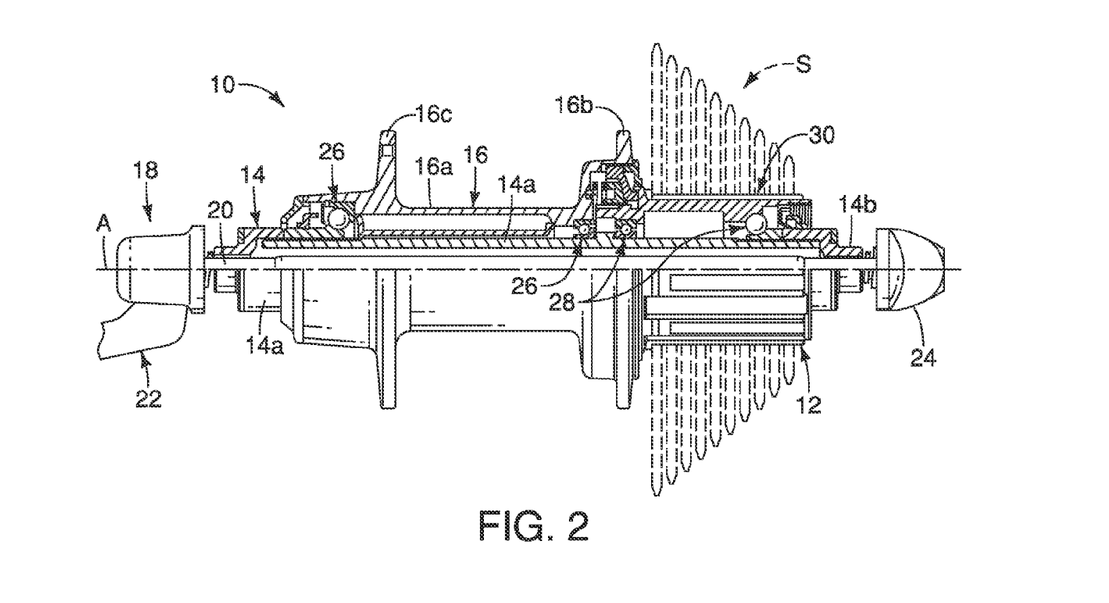
FIG. 2 is a half cross sectional view of the rear bicycle hub illustrated in FIG. 1.
Figure 3:
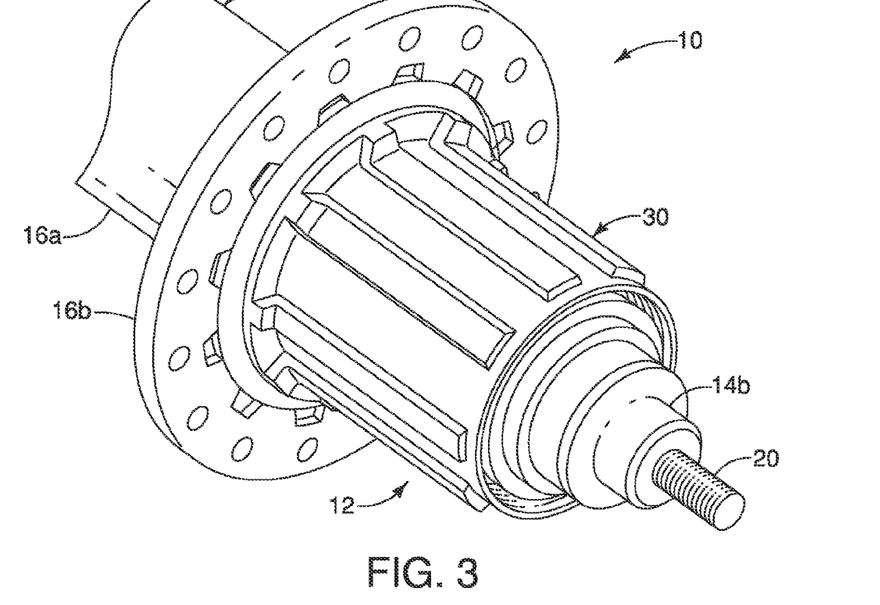
FIG. 3 is an enlarged perspective view of an end portion of the bicycle hub having a bicycle freewheel.

As shown in FIGS. 1 and 2, a frame securing device 18 is provided for attaching the bicycle hub 10 to a bicycle frame (not shown) in a conventional manner. In the first illustrated embodiment, the frame securing device 18 includes a skewer or spindle 20 that has a cam lever mechanism 22 mounted at one end of the spindle 20 and an end cap 24 threaded onto the other end of the spindle 20. Thus, the bicycle hub 10 can be mounted onto a rear section of a bicycle frame of a bicycle.

As shown in FIG. 2, at least one bearing assembly is provided for rotatably supporting the hub shell 16 on the hub axle 14. In the illustrated embodiment, the hub shell 16 is rotatably mounted on the hub axle 14 by a pair of bearing assemblies 26. The bearing assemblies 26 are conventional parts that are well known in the bicycle field, and thus, the bearing assemblies 26 will not be discussed any or illustrated in detail herein. Also, other bearing arrangements can be used as needed and/or desired.

Figure 4:
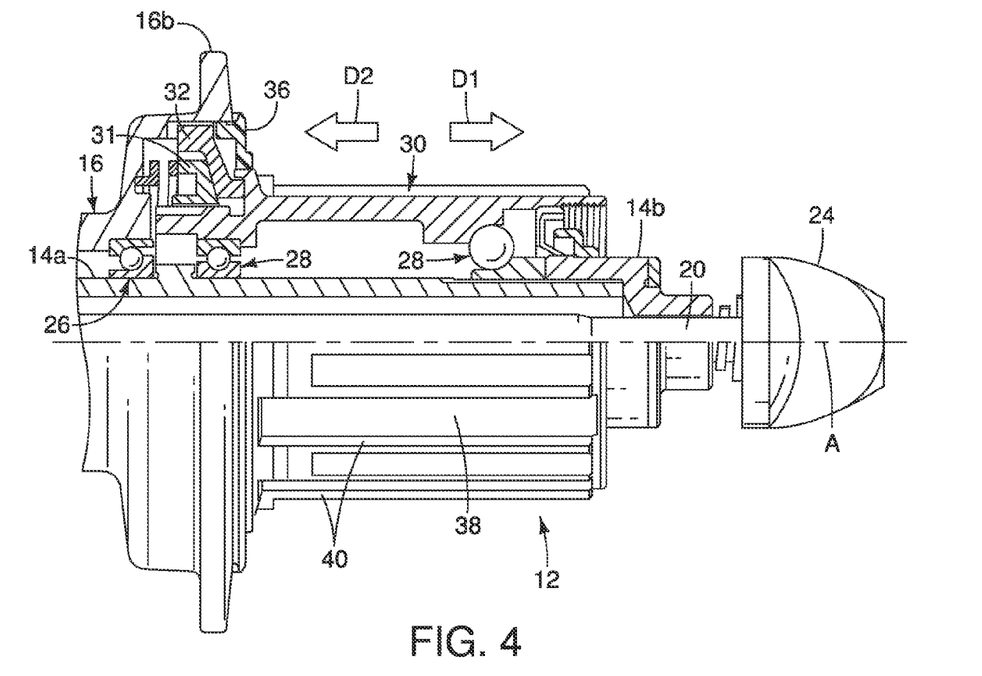
FIG. 4 is an enlarged half cross sectional view of the end portion of the rear bicycle hub of the illustrative embodiment.

Referring now to FIGS. 3 to 7, the bicycle hub 10 further comprises a sprocket support body 30, a first ratchet member 31 and a second ratchet member 32. As shown in FIG. 4, at least one bearing assembly 28 is provided for rotatably supporting the sprocket support body 30 on the hub axle 14. In the first illustrated embodiment, the sprocket support body 30 is rotatably mounted on the hub axle 14 by a pair of bearing assemblies 28. The sprocket support body 30 and the first and second ratchet members 31 and 32 form the bicycle freewheel 12. The bicycle freewheel 12 is configured to receive a plurality of sprockets S in a conventional manner. Coasting or freewheeling occurs when the sprocket support body 30 stops rotating or moves in a non-driving rotational direction (i.e., counterclockwise about the rotational axis A as viewed from the freewheel side of the bicycle hub 10) while the hub shell 16 rotates in a driving rotational direction (i.e., clockwise about the rotational axis A as viewed from the freewheel side of the bicycle hub 10).

Figure 5:
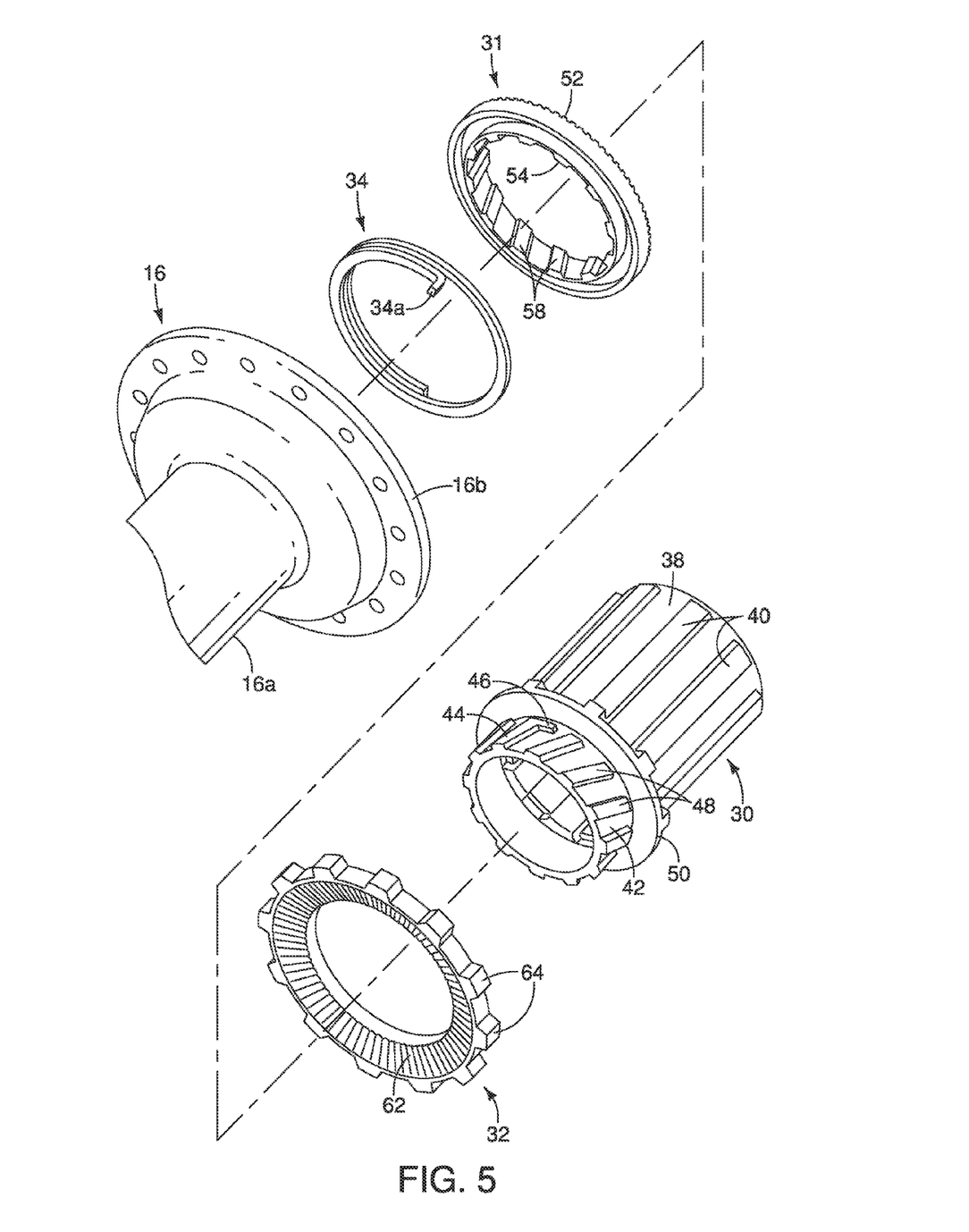
FIG. 5 is an exploded perspective view of the end portion of the rear bicycle hub of the illustrative embodiment.
Figure 6:
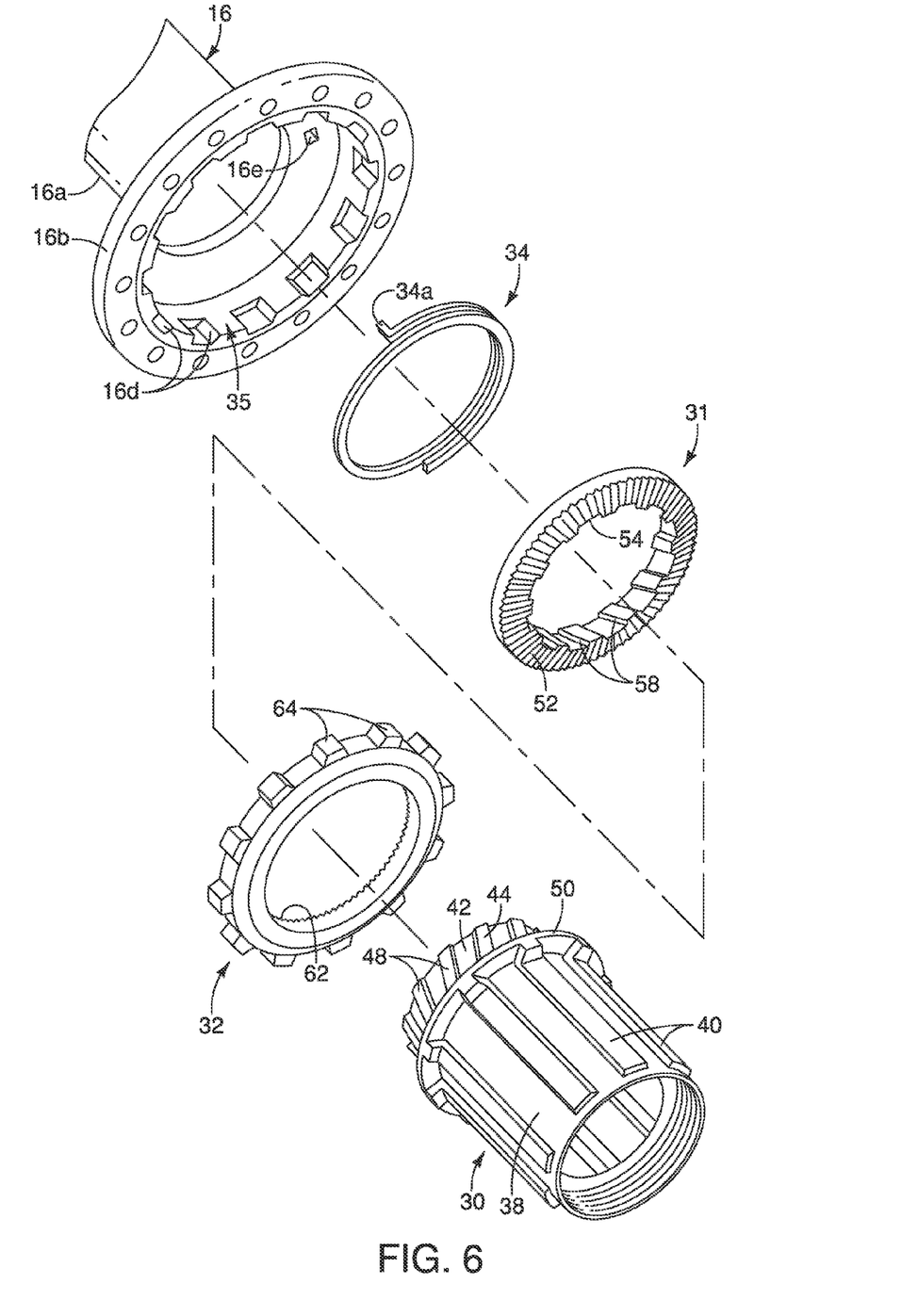
FIG. 6 is another exploded perspective view of the end portion of the rear bicycle hub of the illustrative embodiment.
Figure 7:
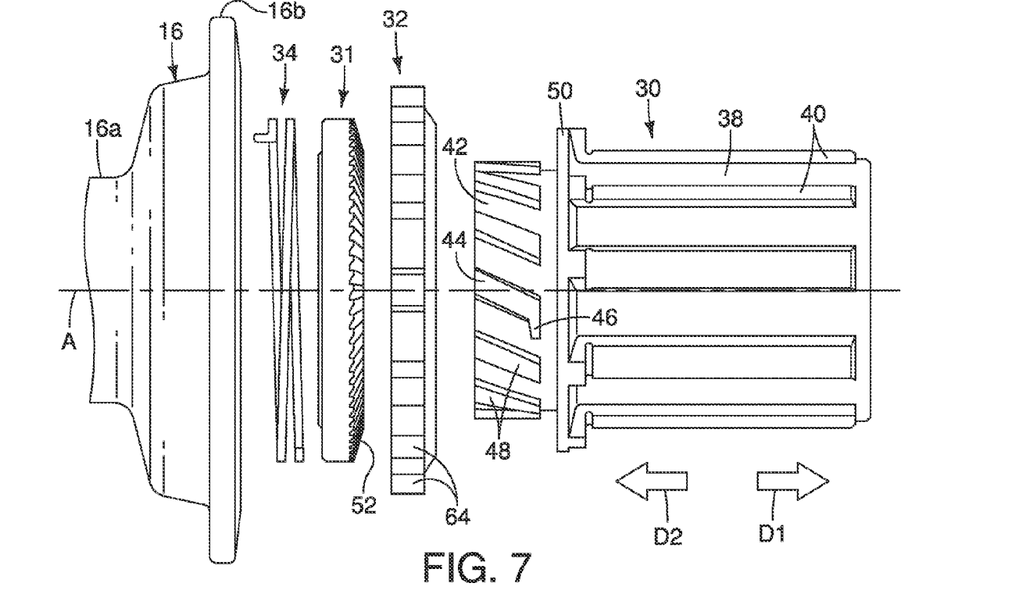
FIG. 7 is an exploded elevational view of the end portion of the rear bicycle hub of the illustrative embodiment
Figure 8:
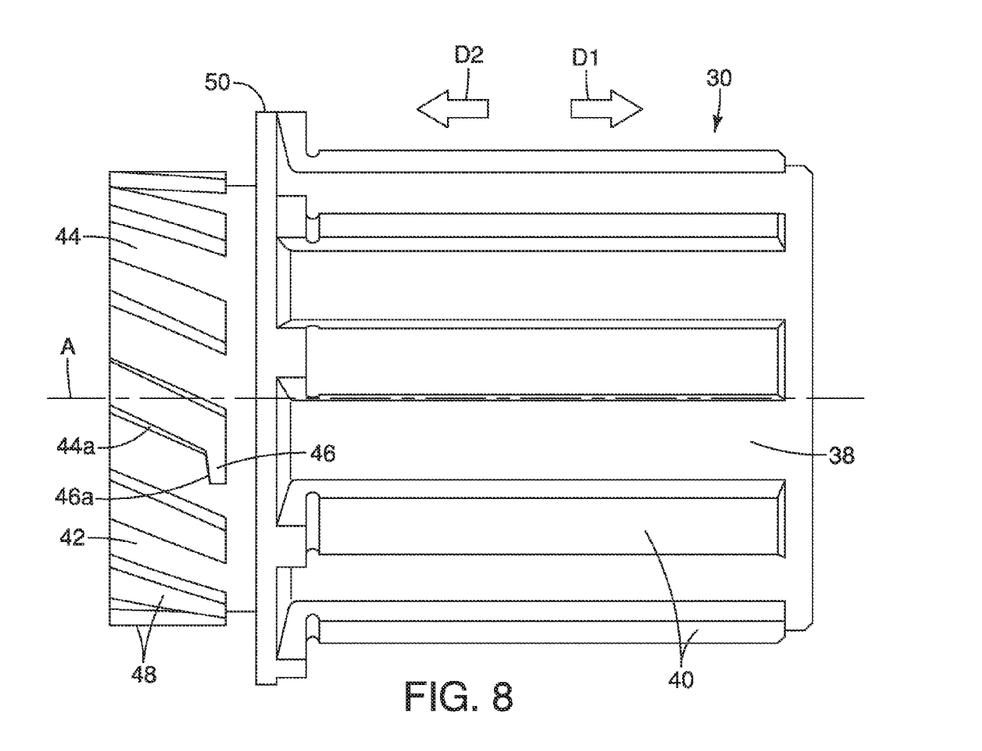
FIG. 8 is an elevational view of a portion of the sprocket support body of the rear bicycle hub of the illustrative embodiment.

As seen in FIGS. 4 to 6, a biasing member 34 is disposed between the hub shell 16 and the first ratchet member 31. The biasing member 34 biases the first ratchet member 31 in an axial direction D1 toward the second ratchet member 32. The biasing member 34 is, for example, a compression spring in the illustrated embodiment. Preferably, the biasing member 34 is configured to rotate with the hub shell 16. As explained later, during coasting, the first ratchet member 31 is moved in an axial direction D2 toward the hub shell 16 when the sprocket support body 30 stops rotating or moves in a non-driving rotational direction relative to the hub shell 16.

Preferably, the hub shell 16 includes an internal space 35. Each of the ratchet support body 30, the biasing member 34 and the first and second ratchet members 31 and 32 are at least partially disposed in the internal space 35 of the hub shell 16. A cover member 36 is provided for covering the internal space 35 between the sprocket support body 30 and the hub shell 16. The cover member 36 also covers an annular gap between the sprocket support body 30 and the hub shell 16.

The sprocket support body 30 constitutes a driving member that has a tubular shape. The sprocket support body 30 is rotatably mounted on the hub axle 14 to rotate around the rotational axis A. The sprocket support body 30 has an outer peripheral surface 38 with a plurality of axially extending splines 40 for non-rotatably engaging the bicycle sprockets S in a conventional manner. The splines 40 are parallel to each other, and extend parallel to the rotational axis A. The bicycle sprockets S are held on the sprocket support body 30 by a conventional nut (not shown) that screws into the sprocket support body 30. The sprocket support body 30 has an outer peripheral surface 42 with a first helical spline 44 that is helically arranged with respect to the rotational axis A. The first helical spline 44 has a first surface 44a that extends helically with respect to the rotational axis A.

The outer peripheral surface 42 of the sprocket support body 30 also has a guiding portion 46 that is configured to guide the first ratchet member 31 toward the hub shell 16 while coasting (also called freewheeling). The guiding portion 46 extends in at least a circumferential direction with respect to the sprocket support body 30. The guiding portion 46 has a second surface 46a that extends helically with respect to the rotational axis A, but at a shallower angle than the first surface 44a. Thus, the second surface 46a is arranged to define an obtuse angle with the first surface 44a. The guiding portion 46 is illustrated as being integral with the first helical spline 44 such that the second surface 46a is contiguous with the first surface 44a. However, the guiding portion 46 does not need to be part of the first helical spline 44. In other words, the guiding portion 46 can be spaced from the first helical spline 44 so that a small gap is provided between the first and second surfaces 44a and 46a such that the second surface 46a is not part of the first helical spline 44.

The sprocket support body 30 includes a plurality of additional helical splines 48 on the outer peripheral surface 42. The outer peripheral surface 42 of the sprocket support body 30 supports the first and second ratchet members 31 and 32. The sprocket support body 30 includes an abutment 50 that abuts the second ratchet member 32 to restrict axial movement of the second ratchet member 32 away from the hub shell 16. The first ratchet member 31 is disposed on an axial side of the second ratchet member 32 that is opposite to the abutment 50 of the sprocket support body 30.

The first ratchet member 31 is an annular member that is concentrically disposed around the hub axle 14. The first ratchet member 31 has at least one first ratchet tooth 52 and a second helical spline 54. The at least one first ratchet tooth 52 is disposed on an axial facing surface of the first ratchet member 31. Preferably, as in the illustrated embodiment, the at least one first ratchet tooth 52 includes a plurality of first ratchet teeth 52. The second helical spline 54 mates with the first helical spline 44. Preferably, as in the illustrated embodiment, the first ratchet member 31 includes a plurality of additional helical splines 58 in mating engagement with the additional helical splines 48 of the sprocket support body 30. The first ratchet member 31 is movably mounted in the axial direction D1 with respect to the sprocket support body 30 via the second helical spline 54 engaging the first helical spline 44 while driving by a first thrust force applied from the sprocket support body 30 in a clockwise direction about the rotational axis A as viewed along from the freewheel side of the bicycle hub 10.

The second ratchet member 32 is an annular member that is concentrically disposed around the hub axle 14. The second ratchet member 32 is a ring shaped member that is concentrically disposed around the hub axle 14. The second ratchet member 32 is sandwiched between the abutment 50 of the sprocket support body 30 and the first ratchet member 31. The second ratchet member 32 is also arranged to float in the radial direction when a thrust force from the sprocket support body 30 is not transmitted to the hub shell 16. The second ratchet member 32 is also arranged to float in the axial direction to prevent an imperfect mesh with the sprocket support body 30 and the first ratchet member 31.

Figure 9:
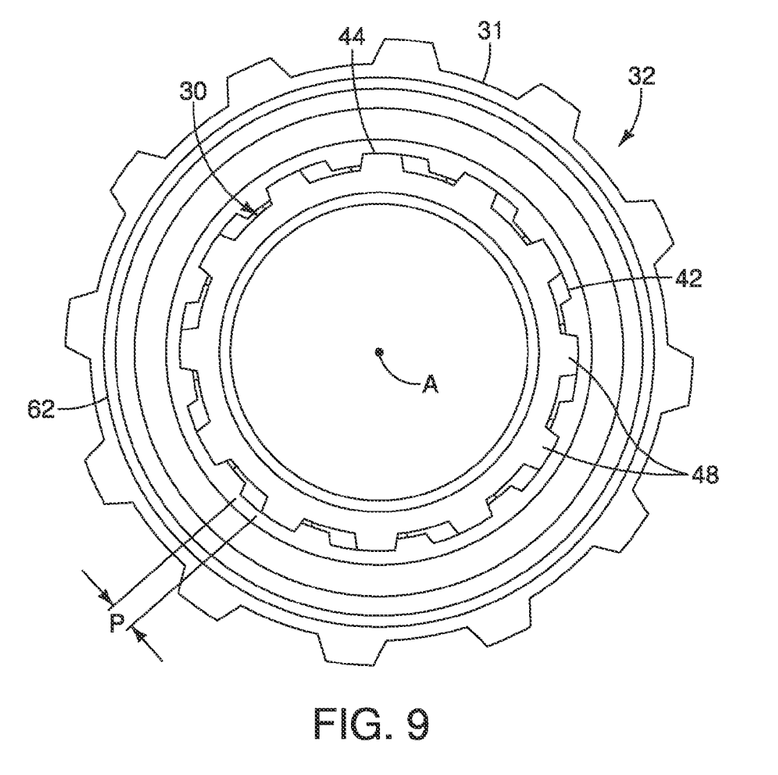
FIG. 9 is an axial end view of the sprocket support body, the first ratchet member and the second ratchet member of the rear bicycle hub of the illustrative embodiment.
Figure 10:
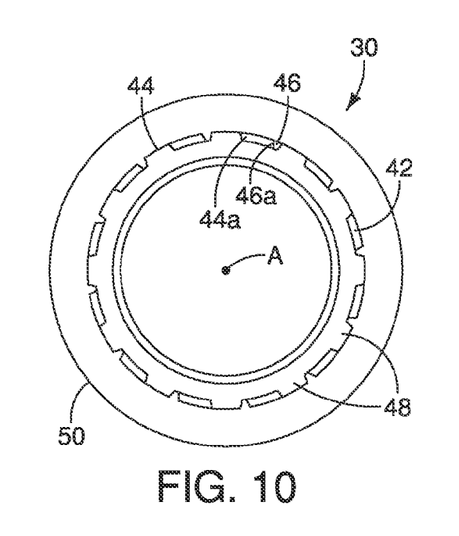
FIG. 10 is an axial end view of the sprocket support body of the rear bicycle hub of the illustrative embodiment.
Figure 11:
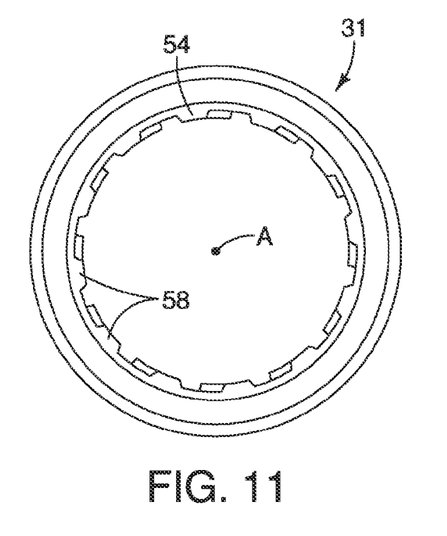
FIG. 11 is an axial end view of the first ratchet member of the rear bicycle hub of the illustrative embodiment.

The second ratchet member 32 has at least one second ratchet tooth 62 that mates with the at least one first ratchet tooth 52. The at least one second ratchet tooth 62 is disposed on an axial facing surface of the second ratchet member 32 that faces the axial facing surface of the first ratchet member 31. The at least one second ratchet tooth 62 mates with the at least one first ratchet tooth 52 to transfer torque from the sprocket support body 30 to the hub shell 16. In other words, the second ratchet member 32 transfers torque to the hub shell 16 applied from the first ratchet member 31 via the hub shell engagement portion 64. Preferably, as in the illustrated embodiment, the at least one second ratchet tooth 62 includes a plurality of second ratchet teeth 62 that mates with the first ratchet teeth 52. As seen in FIG. 9, the first helical spline 44 and the helical spline 58 are dimensioned so that circumferential play P is provided therebetween. In this way, the first ratchet member 31 can rotate relative to the hub shell 16 and die second ratchet member 32 so that the first ratchet member 31 can move axially between an engagement position and a disengagement position. In the engagement position, the second ratchet teeth 62 mates with the first ratchet teeth 52. In the disengagement position, the second ratchet teeth 62 do not contact the first ratchet teeth 52.

The second ratchet member 32 also has a hub shell engagement portion 64 that engages the hub shell 16. Preferably, as in the illustrated embodiment, one of the hub shell engagement portion 64 and the hub shell 16 includes at least one protrusion extending radially and the other of the hub shell engagement portion 64 and the hub shell 16 includes at least one recess that is engaged with the at least one protrusion. In the illustrated embodiment, the hub shell engagement portion 64 is defined by a plurality of protrusions and the hub shell 16 includes a plurality of recess 16d. In this way, the second ratchet member 32 rotates with the hub shell 16, but can also slide axially with respect to the hub shell 16 along the rotational axis A. The first ratchet member 31 is sandwiched between the abutment 50 of the hub shell 16 and the second ratchet member 32.

In the illustrated embodiment, the biasing member 34 has a first anti-rotationally connecting portion 34a (e.g., a protrusion) and the hub shell 16 has a second anti-rotationally connecting portion 16e (e.g., a recess). The first anti-rotationally connecting portion 34a of the biasing member 34 is disposed in the second anti-rotationally connecting portion 16e of the hub shell 16 so the biasing member 34 rotates with the hub shell 16. With the sprocket support body 30 in a rest position (i.e., no torque being applied thereto), the biasing member 34 maintains the first ratchet teeth 52 of the first ratchet member 31 in driving engagement with the second ratchet teeth 62 of the second ratchet member 32. When a coasting torque is applied to the sprocket support body 30, the first ratchet member 31 rotates a little bit in a circumferential direction and slides along the second surface 46a of the guiding portion 46 due to the friction torque between the biasing member 34 and the first ratchet member 31 so that the first ratchet teeth 52 move out of contact with the second ratchet teeth 62. During coasting, the first ratchet member 31 constantly slides between the biasing member 34 and the toothed surface of the second ratchet member 32. Thus, during coasting (i.e., freewheeling), the first ratchet member 31 substantially moves in the axial direction D2 toward the hub shell 16 from the driving or rest position.

In particular, the guiding portion 46 is configured so as to release a meshing engagement between the at least one first ratchet tooth 52 and the at least one second ratchet tooth 62 while coasting. The first ratchet member 31 contacts the guiding portion 46 and disengages from the second ratchet member 32 by a second thrust force caused by friction torque between the biasing member 34 and the first ratchet member 31 while coasting. The first helical spline 54 of the first ratchet member 31 abuts the second surface 46a of the second helical spline 46 of the sprocket support body 30 by the sliding torque. Then a coasting thrust force arises so that the first ratchet member 31 moves against the force of the biasing member 34. As a result, the first ratchet teeth 52 of the first ratchet member 31 do not contact the second ratchet teeth 62 of the second ratchet member 32 during coasting.

However, during driving when the sprocket support body 30 is rotated in the driving direction, the second helical spline 54 of the first ratchet member 31 slides axially along the first surface 44a of the first helical spline 44 on the outer peripheral surface 42 of the sprocket support body 30 in the axial direction D1 of the bicycle hub 10. The first ratchet member 31 is biased towards the second ratchet member 32 by the biasing member 34 in the axial direction D1 of the bicycle hub 10. When the driving torque is applied to the sprocket support body 30, the first ratchet teeth 52 of the first ratchet member 31 and the second ratchet teeth 62 of the second ratchet member 32 are meshed so that the hub shell rotates with the sprocket support body 30. Thus, as the driving torque rises, the mesh engagement between the first ratchet member 31 and the second ratchet member 32 becomes stronger.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hub. Accordingly, these directional terms, as utilized to describe the bicycle hub should be interpreted relative to a bicycle in an upright riding position on a horizontal surface and that is equipped with the bicycle hub. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub comprising:
    a hub axle defining a rotational axis;
    a hub shell rotatably mounted on the hub axle to rotate around the rotational axis;
    a sprocket support body rotatably mounted on the hub axle to rotate around the rotational axis, the sprocket support body having an outer peripheral surface with a first helical spline;
    a first ratchet member having at least one first ratchet tooth and a second helical spline mating with the first helical spline; and
    a second ratchet member having at least one second ratchet tooth mating with the at least one first ratchet tooth and a hub shell engagement portion that engages the hub shell,
    the outer peripheral surface of the sprocket support body having a guiding portion configured to guide the first ratchet member toward the hub shell while coasting, the guiding portion arranged to define an obtuse angle with the first helical spline.

2. The bicycle hub according to claim 1, wherein the at least one first ratchet tooth is disposed on an axial facing surface of the first ratchet member, and the at least one second ratchet tooth is disposed on an axial facing surface of the second ratchet member that faces the axial facing surface of the first ratchet member.

3. The bicycle hub according to claim 1, wherein the first ratchet member is movably mounted in an axial direction with respect to the sprocket support body via the second helical spline engaging the first helical spline while driving by a first thrust force is applied from the sprocket support body.

4. The bicycle hub according to claim 1, wherein the at least one second ratchet tooth mates with the at least one first ratchet tooth to transfer torque from the sprocket support body to the hub shell.

5. The bicycle hub according to claim 1, wherein the guiding portion is configured so as to release a meshing engagement between the at least one first ratchet tooth and the at least one second ratchet tooth while coasting.

6. The bicycle hub according to claim 1, wherein the guiding portion extends in at least a circumferential direction with respect to the sprocket support body.

7. The bicycle hub according to claim 1, wherein the second ratchet member transfers torque to the hub shell applied from the first ratchet member via the hub shell engagement portion.

8. The bicycle hub according to claim 1, wherein one of the hub shell engagement portion and the hub shell includes at least one protrusion extending radially and the other of the hub shell engagement portion and the hub shell includes at least one recess that is engaged with the at least one protrusion.

9. The bicycle hub according to claim 1, further comprising a biasing member disposed between the hub shell and the first ratchet member, the biasing member biasing the first ratchet member in the axial direction toward the second ratchet member.

10. The bicycle hub according to claim 1, wherein the biasing member is configured to rotate with the hub shell, and the first ratchet member contacts the guiding portion and disengages from the second ratchet member by a second thrust force caused by friction torque between the biasing member and the first ratchet member while coasting.

11. The bicycle hub according to claim 1, further comprising a cover member covering an annular gap between the sprocket support body and the hub shell.

12. The bicycle hub according to claim 1, further comprising at least one bearing assembly rotatably supporting the sprocket support body on the hub axle.

13. The bicycle hub according to claim 1, further comprising at least one bearing assembly rotatably supporting the hub shell on the hub axle.

14. The bicycle hub according to claim 1, wherein the at least one first ratchet tooth includes a plurality of first ratchet teeth, and the at least one second ratchet tooth includes a plurality of second ratchet teeth.

15. The bicycle hub according to claim 1, wherein the sprocket support body includes a plurality of additional helical splines on the outer peripheral surface, and the first ratchet member includes a plurality of additional helical splines in mating engagement with the additional helical splines of the sprocket support body.

16. The bicycle hub according to claim 1, wherein the first and second ratchet members are annular members.

17. The bicycle hub according to claim 16, wherein the sprocket support body includes an abutment that abuts the second ratchet member to restrict axial movement of the second ratchet member away from the hub shell, and the first ratchet member is disposed on an axial side of the second ratchet member that is opposite to the abutment of the sprocket support body.

18. The bicycle hub according to claim 17, further comprising a biasing member disposed between the hub shell and the first ratchet member, the biasing member biasing the first ratchet member in the axial direction toward the second ratchet member.

19. The bicycle hub according to claim 18, wherein the hub shell includes an internal space, the outer peripheral surface of the sprocket support body supports the first and second ratchet members, and each of the ratchet support body, the biasing member and the first and second ratchet members being at least partially disposed in the internal space of the hub shell.

20. The bicycle hub according to claim 19, further comprising a cover member covering the internal space between the sprocket support body and the hub shell.

* * * * *